(12) United States Patent
Hakim

(10) Patent No.: US 9,389,091 B2
(45) Date of Patent: Jul. 12, 2016

(54) METHODS AND APPARATUS FOR ATTRIBUTE-BASED NAVIGATION

(71) Applicant: SAFE Path Technologies, LLC, Austin, TX (US)

(72) Inventor: Omar Besim Hakim, Austin, TX (US)

(73) Assignee: Safe Path Technologies, LLC, Austin, TX (US)

( * ) Notice: Subject to any disclaimer, the term of this patent is extended or adjusted under 35 U.S.C. 154(b) by 18 days.

(21) Appl. No.: 13/718,977

(22) Filed: Dec. 18, 2012

(65) Prior Publication Data

US 2015/0112581 A1     Apr. 23, 2015

Related U.S. Application Data

(60) Provisional application No. 61/577,895, filed on Dec. 20, 2011, provisional application No. 61/591,159, filed on Jan. 26, 2012.

(51) Int. Cl.
*G01C 21/34*     (2006.01)
(52) U.S. Cl.
CPC ........ *G01C 21/3476* (2013.01); *G01C 21/3461* (2013.01)

(58) Field of Classification Search
CPC .................................................. G01C 21/3453
See application file for complete search history.

(56) References Cited

U.S. PATENT DOCUMENTS

| 6,484,092 B2* | 11/2002 | Seibel ........................... 701/465 |
| 2009/0171559 A1* | 7/2009 | Lehtiniemi et al. ........... 701/201 |
| 2011/0136463 A1* | 6/2011 | Ebdon et al. ................ 455/404.1 |
| 2011/0169647 A1* | 7/2011 | Morley ....................... 340/573.4 |
| 2011/0246055 A1* | 10/2011 | Huck et al. .................... 701/201 |

FOREIGN PATENT DOCUMENTS

WO       WO 2011117805 A1 *  9/2011

* cited by examiner

*Primary Examiner* — Mussa A Shaawat
*Assistant Examiner* — Kelly D Williams
(74) *Attorney, Agent, or Firm* — Garlick & Markison; Bruce E. Stuckman

(57) ABSTRACT

Various embodiments of methods and apparatus for attribute-based navigation are disclosed. In one embodiment, responsive to a request for a location having a variable attribute, a destination is selected based at least in part upon a value of the variable attribute. Navigation instructions from a current location are provided.

18 Claims, 13 Drawing Sheets

Navigation problem map
100

METHODS AND APPARATUS FOR ATTRIBUTE-BASED NAVIGATION

CLAIM OF PRIORITY TO PROVISIONAL APPLICATION

This application claims benefit of priority of U.S. Provisional Application Ser. No. 61/577,895 entitled "Methods and Apparatus for Attribute-Based Navigation" filed Dec. 20, 2012, the content of which is incorporated by reference herein in its entirety and for all purposes.

This application further claims benefit of priority of U.S. Provisional Application Ser. No. 61/591,159 entitled "Methods and Apparatus for Attribute-Based Navigation" filed Jan. 26, 2011, the content of which is incorporated by reference herein in its entirety and for all purposes.

BACKGROUND

Description of the Related Art

A Personal Navigation Assistant (PNA), also known as Personal Navigation Device or Portable Navigation Device (PND), is a portable electronic product that combines a positioning capability (such as GPS) and navigation functions to guide a user to a user-provided destination, usually an address.

The earliest PNAs were hand-held GPS units (circa mid 1980s) which were capable of displaying the user's location on an electronic map. The latest generation of PNA have sophisticated navigation functions for guiding a user to a user-provided destination and feature a variety of user interfaces including maps, turn-by-turn guidance and voice instructions for guiding a user to the user-provided destination.

SUMMARY

Various embodiments of methods and apparatus for attribute-based navigation are disclosed. In one embodiment, responsive to a request for a location having a variable attribute, a destination is selected based at least in part upon a value of the variable attribute. Navigation instructions from a current location are provided.

Figure 1:
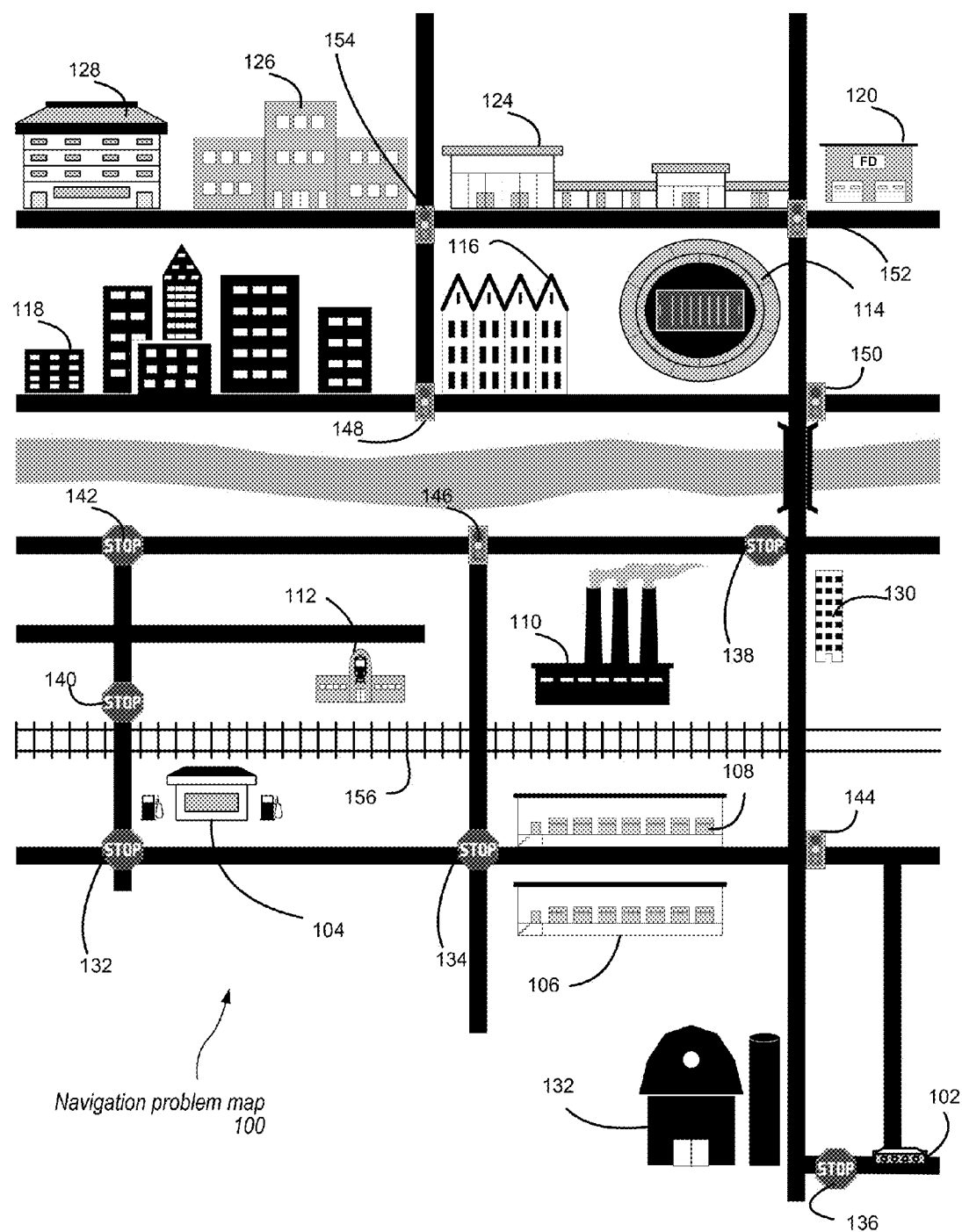
FIG. 1 depicts a map of a navigation problem suitable for performing attribute-based navigation, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art.

An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Introduction to Attribute-Based Navigation

Various embodiments of methods and apparatus for attribute-based navigation are disclosed. In some embodiments, one or more processors are used to perform, responsive to a request for a location having a variable attribute, selecting a destination based at least in part upon a value of the variable attribute, and providing navigation instructions from a current location to the destination. Some embodiments further perform calculating a set of values of the variable attribute for respective ones of a set of possible destinations. Additionally, some embodiments perform updating the set of values of the variable attribute for respective ones of the set of possible destinations based at least in part upon condition changes at the respective ones of the set of possible destinations.

Further, some embodiments perform selecting a path from the current location to the destination based in part upon a set of values of the variable attribute for respective ones of a set of possible paths to the destination. Some embodiments perform selecting a path from a revised location to the destination based in part upon a set of values of the variable attribute for respective ones of a set of possible revised paths to the destination. In some embodiments, the selecting further includes selecting the path from the revised location to the destination based in part upon updated conditions of locations along the path. Some embodiments also perform calculating a set of values of the variable attribute for respective ones of a set of possible paths to each of a set of possible destinations. In some such embodiments, the selecting the destination based at least in part upon a value of the variable attribute further includes selecting the destination based at least in part upon the set of values of the variable attribute for the respective ones of the set of possible paths to each of the set of possible destinations. Some embodiments additionally perform transmitting a distress signal. In some embodiments, the distress signal comprises the current location and the navigation instructions from the current location to the destination.

While a navigation problem is described below with respect to a variable attribute of safety, one of skill in the art will readily comprehend in light of having read the present disclosure that embodiments encompass a wide range of variable attributes, which include access to medical care, access to fuel, access to food, weather conditions, scenery, shopping, or any other variable attribute. Embodiments allow automated selection of a destination and a path with respect to the attribute, and provision of navigation instructions, wherein a user of an attribute based navigation system need not know the destination or the values of various locations with respect to the attribute. Some embodiments receive a request for a destination having a variable attribute and provide directions to the destination having the variable attribute without providing the identity or location of the destination to the requestor. Thus, a user may request directions to a "safe place" or "along a safe path" or to a "scenic place" or along a "scenic path" and may receive and follow the directions without knowing the ultimate destination.

Some embodiments may include a means for performing attribute-based navigation. For example, an attribute-based navigation module may perform, responsive to a request for a location having a variable attribute, selecting a destination based at least in part upon a value of the variable attribute, and providing navigation instructions from a current location to the destination, as described herein. The attribute-based navigation module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform, responsive to a request for a location having a variable attribute, selecting a destination based at least in part upon a value of the variable attribute, and providing navigation instructions from a current location to the destination, as described herein. Other embodiments of the attribute-based navigation module may be at least partially implemented by hardware circuitry and/or firmware stored, for example, in a non-volatile memory.

As used herein, a variable attribute is defined to mean a quality of a location or path that differs between locations or at a particular location during a period of time, as defined by a rubric of metrics describing objective features associated with the quality of the location or path. For example, the variable attribute "safety" may be measured in terms of the number and type of persons present or expected to be present at a particular place at a particular time, the availability of police or other first responders at the location, the lighting of the location, the crime rate associated with the location or a general area around it, or other factors expected to enhance the security of persons in the location. As a further example, the variable attribute "access to medical care" may be measured in terms of the number and type of medical service providers present and available at a location. As an additional example, the variable attribute "path difficulty" may be defined as the net incline along a walking path. As an alternative example, the variable attribute "scenic beauty" may be defined as the net elevation change within a fixed distance of a location.

As used herein, a location having a variable attribute is defined to mean a location selected for a high value in the scoring system for the variable attribute among a set of potential destinations. Attributes vary between embodiments, as described below. Representative examples of attributes include access to medical care, access to fuel, access to food, weather conditions, scenery, shopping, difficulty of terrain, safety, change in elevation, or any other variable attribute. Methods for calculating attributes vary between embodiments.

An example of a method for calculating the attribute "scenic beauty" includes calculating the gradient in elevation within twenty miles of a point or path. An example of a method for calculating the attribute "path difficulty" includes calculating the gradient in elevation along a path. An example of a method for calculating the attribute "fun" includes calculating the number of entertainment points of interest within a block of a point or path. In some embodiments, values of attributes may vary based on time of day. For example, some embodiments may assign values of a scenic beauty attribute based on elevation gradients during the day and based on a clear view of an urban skyline at night. In some embodiments, values of attributes may also vary based on weather conditions. An example of a method for calculating the attribute "fun" includes calculating the number of persons sending messages from wireless handsets in bars within a block of a point or path. An example of a method for calculating the attribute "fun" includes calculating the number of bars advertising happy hour specials within a block of a point or path. An example of a method for calculating the attribute "disability accessibility" includes calculating the number of roadside accommodations along a path or near a point that provide wheelchair ramps. An example of a method for calculating the attribute "disability accessibility" includes calculating the number of roadside accommodations along a path or near a point that were constructed after a given date (e.g., 1993).

In a museum, an example of a method for calculating the attribute "impressionism" includes calculating the number of impressionist paintings and sculptures along a line of sight of a point or path. Attributes are associated with a point, a path, or both in some embodiments. In some embodiments, a path may be selected for a value of an attribute different from the attribute for which the destination is selected. For example, a path may be chosen for a value of a safety attribute and a destination may be chosen for a value of access to medical care attribute or a path may be chosen for a value of a scenic beauty attribute and a destination may be chosen for a value of an access to entertainment for five-year-olds attribute. In some embodiments, paths may be chosen based on a known destination.

As used herein, a request for a location having a variable attribute is defined to mean a user request for a destination selected for a high value in the scoring system for the variable attribute among a set of potential destinations and instructions for reaching the destination. In some embodiments, the user will not necessarily know the scoring system for the variable attribute, the location of the destination, or the set of potential destinations at the time of the request or while receiving the directions.

FIG. 1 depicts a map of a navigation problem suitable for performing attribute-based navigation, according to some embodiments. Embodiments provide a system for, responsive to a request for a location having a variable attribute, selecting a destination based at least in part upon a value of the variable attribute, and providing navigation instructions from a current location to the destination. With respect to the navigation problem map 100 illustrated in FIG. 1, assume that a user of a PNA 102 becomes concerned for the user's physical security. For instance, assume that PNA 102 is located in a moving automobile and a user of PNA 102 is concerned that the user is being followed by a party with hostile intentions. In some embodiments, PNA 102 can receive, and in some embodiments can be used to send, a request for a location having a variable attribute. While both variable attributes and the systems used to score those variable attributes vary widely between embodiments, with respect to the navigation problem illustrated in navigation problem map 100, the variable attribute is defined as 'safety.' In some embodiments, a user of PNA 102 is able to press a single button on PNA 102 to request a location having the variable attribute of safety.

Embodiments select a destination based at least in part upon a value of the safety variable attribute and provide navigation instructions from a current location of PNA 102 to the destination. Some embodiments perform calculating a set of values of the variable attribute for respective ones of a set of possible destinations. For example, possible destinations include gas station 104, warehouses 106-108, factory 110, train station 112, stadium 114, residential complex 116, police station 118, fire station 120, office building 130, shopping center 124, school 126, and hospital 128. In one embodiment, police station 118, fire station 120, and hospital 120 are scored as having a high value of a safety attribute due to the presence of emergency responders. Warehouses 106-108 and factory 110 are scored has having a low value of a safety attribute due to the likelihood of a low population density. Shopping center 124 and gas station 104 have a moderate value of a safety attribute due to the possibility of large numbers of customers.

Some embodiments perform updating the set of values of the variable attribute for respective ones of the set of possible destinations based at least in part upon condition changes at the respective ones of the set of possible destinations. For example, a value of a safety attribute for stadium 114 may be higher during a football game (with corresponding large crowds present with corresponding large numbers of police) and lower during non-event periods. Likewise, a value of a safety attribute for shopping center 124 may be higher during shopping hours (with corresponding large crowds present) and lower during periods when the public is not provided access to shopping center 124.

Some embodiments further perform selecting a path from the current location to the destination based in part upon a set of values of the variable attribute for respective ones of a set of possible paths. For example, assuming selection of fire station 120 as a destination for PNA 102, embodiments can score paths for the variable attribute of safety based in part on traffic conditions, for example preferring paths with stop signs 132-142 over paths with traffic signals 144-154 as being safer due to the presumed shorter duration of a required stop at a stop sign. Likewise a path may, for example, be scored for the variable attribute of safety based on the presence of items along the path. For example, assuming that a path is needed from PNA 102 to gas station 104, a path through stop signs 138 and 142 as well as traffic signal 146 may be preferred over a path through signs 132 and 134 as well as traffic signal 144 to avoid passing between urban blight represented by warehouses 106 and 108. In some embodiments, a destination is selected based in part upon the attribute scores of potential paths.

In an alternative embodiment in which a navigation problem map is a map of a battlefield, the presence of friendly or opposing forces (not shown), the presence of friendly or hostile forces along a path, or of automated ordinance (e.g., mines, improvised explosive devices) may be used to generate scores for the variable attribute of safety. Likewise, topographic features or the presence of tall buildings, which could conceal unknown enemy forces, may be used to generate scores for the variable attribute of safety.

Some embodiments perform selecting a path from a revised location to the destination based in part upon a set of values of the variable attribute for respective ones of a set of possible revised paths to the destination. In some embodiments, possible paths are recalculated as PNA 102 moves within navigation problem map 100. In some embodiments, the selecting includes selecting the path from the revised location to the destination based in part upon updated conditions of locations along the path. Continuing with the battlefield example described above, the value of a safety attribute may change in real time due to troop movements, artillery fire, or gain or loss of air cover.

Some embodiments perform selecting a path from a location based in part upon a set of values of the variable attribute for respective ones of a set of possible revised paths, without respect to or without having selected a destination. That is, a user may simply request a path having an attribute, and the path can be determined based on the attribute with no particular destination in mind. In some embodiments, possible paths are recalculated as PNA 102 moves within navigation problem map 100. In some embodiments, the selecting includes selecting the path from the revised location based in part upon updated conditions of locations along the path. Continuing with the battlefield example described above, the value of a safety attribute may be adequate with respect to a particular destination as long as the path has a higher value of the safety attribute than the current location. In a battlefield example, a person being shelled may be content to travel along any path where they are out of the range of artillery, even if a destination is not identified.

Some embodiments perform calculating a set of values of the variable attribute for respective ones of a set of possible paths to each of a set of possible destinations. In some such embodiments, the selecting the destination based at least in part upon a value of the variable attribute further comprises selecting the destination based at least in part upon the set of values of the variable attribute for the respective ones of the set of possible paths to each of the set of possible destinations. For example, fire station 120 may be scored for the variable attribute of safety, with respect to the destination itself, as being inferior to police station 118. However, fire station 120 may be selected to avoid a path crossing in front of residential complex 116, if a path crossing in front of residential complex 116 has a low safety score due to crime associated with residential complex 116.

Some embodiments support attribute fencing, such that certain contained areas are marked as areas for which a broad area of terrain has a particular value of a particular attribute. For example, an attribute fence specified and contained by a set of points or a point and radius around residential complex 116 may indicate that the area has a low value of a safety attribute. In some embodiments, such an attribute fence may be established along a line of demarcation, such as railroad track 156, indicating a low value of a safety attribute for the "wrong side of the tracks." In some embodiments, attribute values are associated with points, such as destinations, paths, contained areas defined by an attribute fence, or uncontained areas defined by a line on a map. Some embodiments perform calculating a set of values of the variable attribute for respective ones of a set of possible paths based on location relative to an attribute fence.

Some embodiments perform calculating a set of values of the variable attribute for respective ones of a set of destinations based on location relative to an attribute fence. In some embodiments, PNA 102 automatically sends a distress signal in response to presence of PNA 102 in a location defined as prohibited by virtue of an attribute fence with a score below an acceptable threshold. For example, an attribute fence might specify a low value of a safety attribute for an "entertainment district" and PNA 102 might send a distress signal to an owner of a vehicle associated with PNA 102 if PNA 102 enters the "entertainment district" specified by the applicable attribute fence. Attribute fences may change with regard to weather, time of day, number of miles already driven during the day, or other variable factors. While navigation problem map 100 has been described herein with respect to a variable attribute of safety, one of skill in the art will readily comprehend in light of having read the present disclosure that embodiments encompass a wide range of variable attributes, which include access to medical care, access to fuel, access to food, weather conditions, scenery, shopping, difficulty of terrain, change in elevation, or any other variable attribute. Embodiments allow automated selection of a destination and a path with respect to the attribute, wherein the user need not know the destination or the values of various locations with respect to the attribute.

Example Implementations

Figure 2:
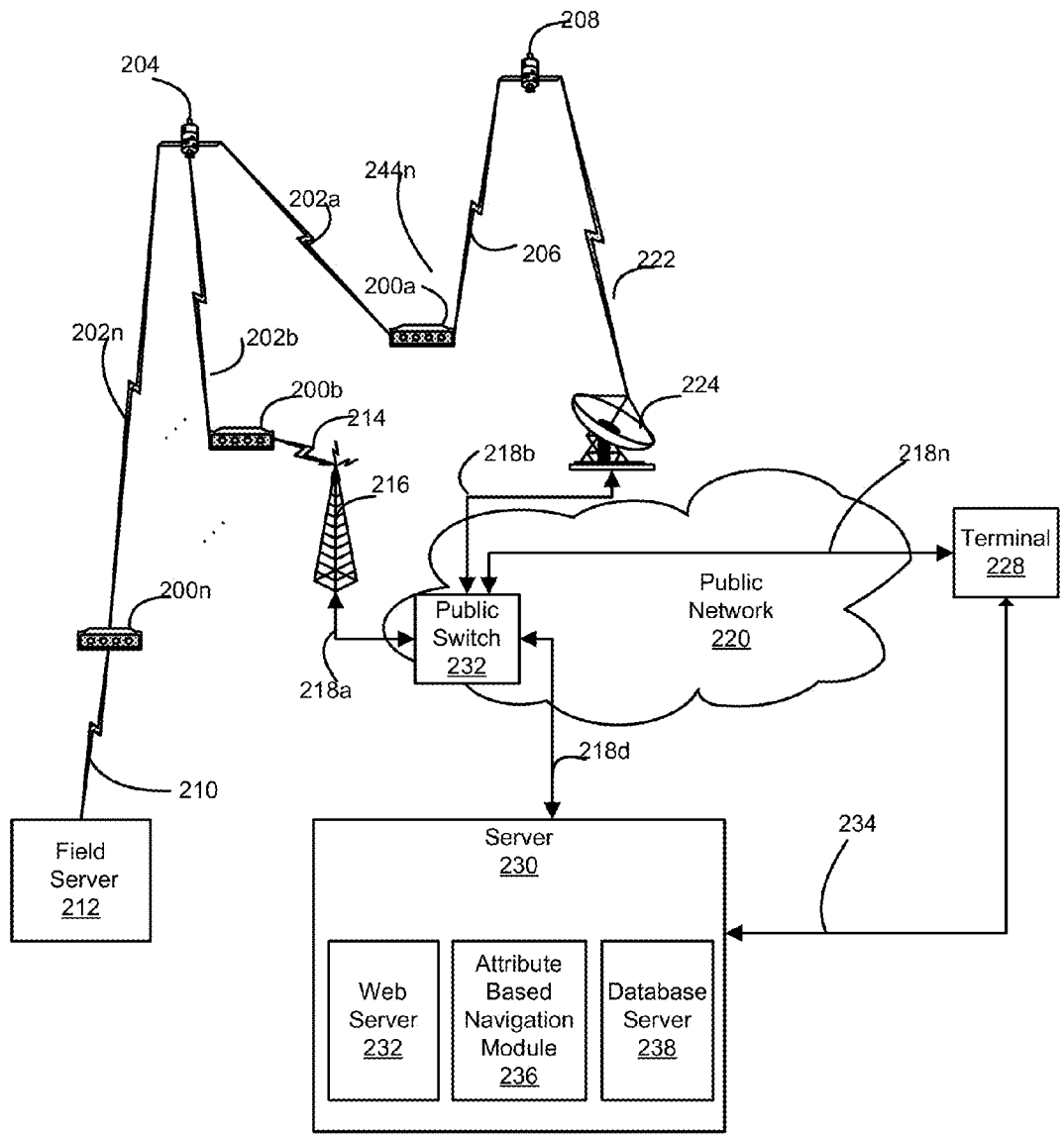
FIG. 2 illustrates a system for performing attribute-based navigation, according to some embodiments.

FIG. 2 illustrates a system for performing attribute-based navigation, according to some embodiments. PNAs 200a-200n receive location signals 202a-202n from a global positioning system (GPS) satellite 204.

As used with respect to an embodiment of the present invention, the notation XXXa-XXXn indicates a flexibly variable quantity of items, and the presence of differently numbered devices bearing the same reference letter (e.g., 202a and 200a), does not necessarily indicate a correspondence or interaction between differently numbered devices bearing the same reference letter. Further, the recurrence of 'n' as an alphabetical designator does not indicate that multiple flexibly variable quantities of devices are equal. Nor does the designation of a single member of such a plurality as 'n' indicate that it necessarily corresponds to an 'nth' member of a different plurality, though they may correspond.

While one GPS satellite 204 is illustrated for the purpose of simplicity in FIG. 1, one skilled in the art will, in light of the present disclosure, realize that conventional location techniques employ a plurality of signals transmitted from a constellation of satellites similar to GPS satellite 204. While embodiments of the present invention are illustrated with respect to location signals 202a-202n from a satellite 204 of the global positioning system, one skilled in the art will, in light of the present disclosure, realize that embodiments of the present invention can be practiced with a broad range of location-determination systems, including, for example, both radio-frequency and gyroscopic systems.

In one embodiment, PNAs 200a-200n are capable of transmitting and receiving data and messages in several ways. PNA 200a transmits and receives data and messages over a satellite uplink 206 to a communications relay satellite 208, which then delivers downlink signals 222 to a satellite signal receiver 224. PNA 200b transmits and receives data and messages over a medium-range wireless signal 214, such as the global system for mobile communications (GSM) network, to a base station 216. PNA 200n transmits and receives data and messages over a short-range radio connection 210, such as a connection complying with one or more of the Institute for Electrical and Electronics Engineers (IEEE) 802.11a/b/g standards ("Wi-Fi"), to a field server 212, which can integrally contain or be connected to a radio-frequency transceiver (not shown) for handling short-range radio connection 210. As one of skill in the art will readily comprehend in view of having read the present disclosure, other methods of radio frequency communication are used in embodiments without departing from the scope and intent of the present disclosure.

While, for the sake of simplicity in illustration, an embodiment of the present invention is illustrated in FIG. 2 with respect to each of PNAs 200a-200n communicating over only a single mode of communication, one skilled in the art will, in light of the present disclosure, realize that each of PNAs 200a-200n are capable, in varying embodiments of the present invention, of communicating using several modes of communication without departing from embodiments of the present invention. Further, one skilled in the art will, in light of the present disclosure, realize that each of PNAs 200*a*-200*n* are capable, in varying embodiments of the present invention, of communicating using modes of communication not illustrated in FIG. 2, without departing from embodiments of the present invention.

Public network links 218*a*-218*n*, which are part of a public network 220 mediated by a public switch 232, connect base station 216 and satellite signal receiver 224, as well as a terminal 228, to a server 230. In one embodiment, server 230 includes instructions stored on a computer-readable medium and executed by a processor.

The example embodiment shown in FIG. 2 illustrates specific uses of finite quantities of private network links 234 and public network links 218*a*-318*n*. One skilled in the art will quickly realize, in light of the present disclosure, that alternative embodiments and implementations of the present invention utilize different configurations and quantities of private network links 234 and public network links 218*a*-218*n* as well as varying virtual private network connections to connect various elements used in implementing embodiments of the present invention. In one embodiment, data for use by server 230 can be acquired through user input at terminal 228, data feed from database server 238, or through a third party, which can provide complete databases, such as a database of weather and geography, battlefield conditions, traffic conditions, commercial service availability, availability of medical care, or other conditions related to a variable attribute. Some content of database server 238 may be scraped from public sources, such social networks on the Internet or other publicly available Internet servers. In one embodiment, PNAs 200*a*-200*n* receive location signals 202*a*-202*n* from a global positioning system (GPS) satellite 204, and server 230 provides several location-aware functions, as will be described below.

In one embodiment, server 230 contains a web server 232, an attribute-based navigation module 236 and a database server 238. In some embodiments, one of PNAs 200*a*-200*n* transmits a request for a location having a variable attribute. In some embodiments, a configuration for criteria for evaluating the variable attribute or the request for a variable attribute is provided through web server 232. In some embodiments, selecting a destination based at least in part upon a value of the variable attribute is performed by attribute based navigation module 236 using geographic information for evaluating values of the variable attribute that is provided by a database server 238. In some embodiments, providing navigation instructions from a current location to the destination is performed by attribute based navigation module 236 using geographic information for evaluating values of the variable attribute that is provided by a database server 238.

While attribute based navigation module 236 is illustrated as a component of server 230, one of skill in the art will realize in light of having read the present disclosure that all or part of web server 232, attribute based navigation module 236, or database server 238 may be located on PNAs 200*a*-200*n*, with the result that embodiments will vary widely with respect to the functions performed on PNAs 200*a*-200*n* and server 234.

In some embodiments, calculating a set of values of the variable attribute for respective ones of a set of possible destinations is performed by attribute based navigation module 236 using geographic information for evaluating values of the variable attribute that is provided by a database server 238, as is updating the set of values of the variable attribute for respective ones of the set of possible destinations based at least in part upon condition changes at the respective ones of the set of possible destinations. In some embodiments condition changes at the respective ones of the set of possible destinations may be received from field server 212, terminal 228, or various ones of PNAs 200*a*-200*n*. In some embodiments, information for evaluating values of the variable attribute includes direct data representing the value of the attribute. In some embodiments, information for evaluating values of the variable attribute includes data for algorithmically calculating the value of the attribute from the data. Examples of such data include indirect data for evaluating the attribute, such as crime statistics, traffic data, geographic or topographic features, or wireless transmission activity occurring near the area.

In some embodiments, selecting a path from the current location to the destination based in part upon a set of values of the variable attribute for respective ones of a set of possible paths to the destination is performed by attribute based navigation module 236 using geographic information for evaluating values of the variable attribute that is provided by a database server 238. In some embodiments, transmitting a distress signal, wherein the distress signal comprises the current location and the navigation instructions from the current location to the destination is performed by attribute based navigation module 236 using geographic information that is provided by a database server 238. In some embodiments, such a distress signal is transmitted to a central controller (such as a dispatcher at terminal 228) or a field server 212 (e.g., such as an AWACS aircraft).

In some embodiments, calculating a set of values of the variable attribute for respective ones of a set of possible destinations is performed by PNAs 200*a*-200*n* using geographic information for evaluating values of the variable attribute that is provided by a database server 238, as is updating the set of values of the variable attribute for respective ones of the set of possible destinations based at least in part upon condition changes at the respective ones of the set of possible destinations. In some embodiments condition changes at the respective ones of the set of possible destinations may be received from field server 212, terminal 228, or various ones of PNAs 200*a*-200*n*.

In some embodiments, selecting a path from the current location to the destination based in part upon a set of values of the variable attribute for respective ones of a set of possible paths to the destination is performed by PNAs 200*a*-200*n* using geographic information for evaluating values of the variable attribute that is provided by a database server 238. In some embodiments, transmitting a distress signal, wherein the distress signal comprises the current location and the navigation instructions from the current location to the destination is performed by PNAs 200*a*-200*n*. In some embodiments, such a distress signal is transmitted to a central controller (such as a dispatcher at terminal 228) or a field server 212 (e.g., such as an AWACS aircraft). In other embodiments, such a distress signal is transmitted to other PNAs 200*a*-200*n*.

Figure 3:
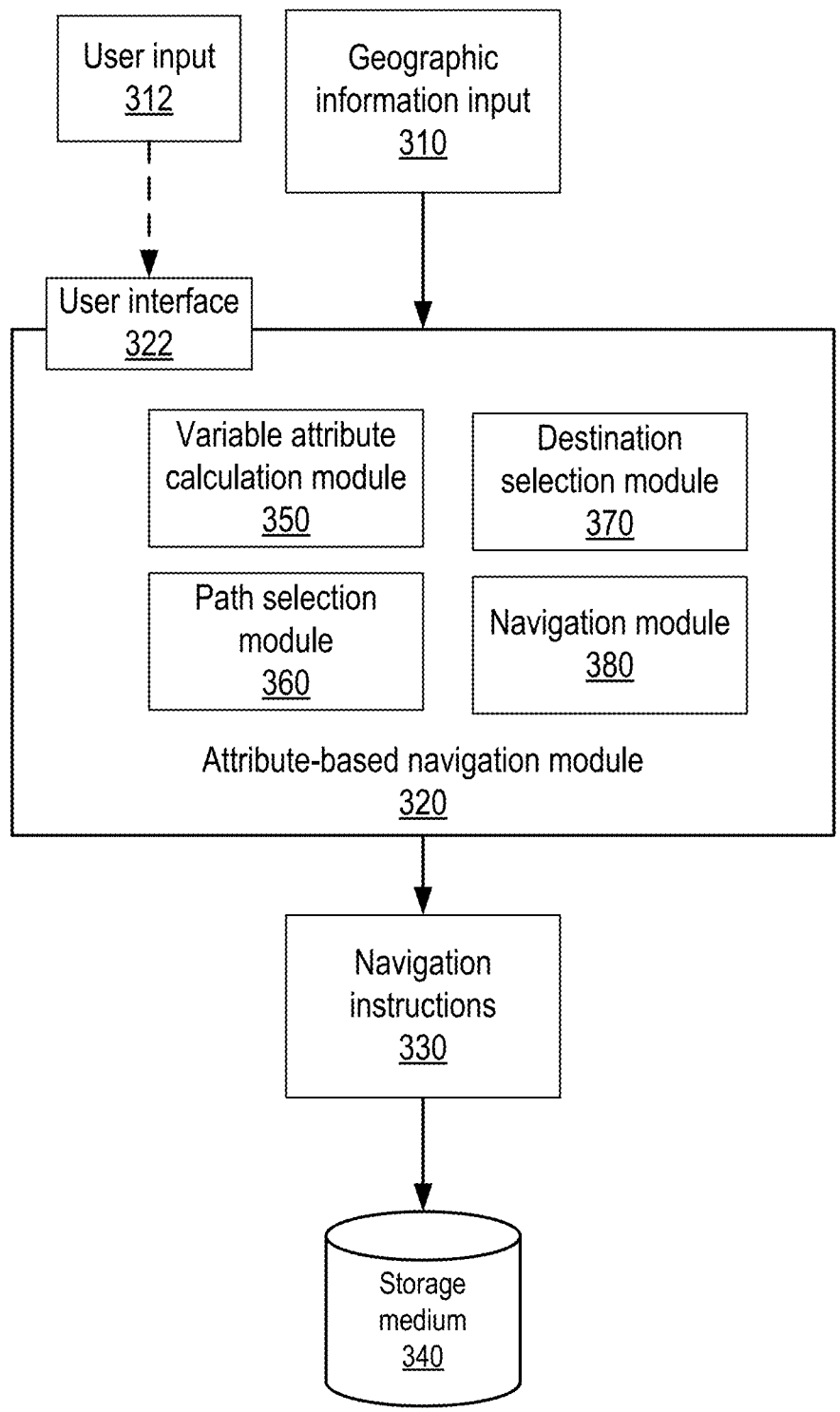
FIG. 3 depicts a module for performing attribute-based navigation, according to some embodiments.

FIG. 3 illustrates a module for performing attribute-based navigation, according to some embodiments. An attribute based navigation module 320 may implement one or more of the attribute-based navigation techniques and tools illustrated in FIGS. 1 and 5 through 11. Attribute-based navigation module 320 may, for example, implement one or more of an attribute-based navigation tool, a configuration tool, and a distress signal transmission tool. FIG. 12 illustrates an example computer system on which embodiments of attribute based navigation module 320 may be implemented. Attribute-based navigation module 320 receives as input items of geographic information input 310. Examples of geographic information input 310 include location of PNAs and geographic information usable to calculate values of a variable attribute for a set of potential destinations and a set of potential paths. Attribute-based navigation module 320 implements or supports, in some embodiments, one or more of an attribute-based navigation tool, a configuration tool, and a distress signal transmission tool. In some embodiments, attribute-based navigation module 320 selects a destination based at least in part upon a value of the variable attribute and generates navigation instructions 330 from a current location to the destination according to a configuration received as user input 312 through user interface 322, using a configuration tool. In some embodiments, attribute-based navigation module 320 selects a path based at least in part upon values of the variable attribute and generates navigation instructions 330 along the path. Navigation instructions 330 may, for example, be stored to a storage medium 340, such as system memory, a disk drive, DVD, CD, etc.

In some embodiments, attribute-based navigation module 320 may provide a user interface 322 via which a user may interact with the attribute-based navigation module 320, for example to designate and configure a variable attribute, send a request for a location having a variable attribute, receive navigation instructions, and to perform an attribute-based navigation method as described herein. In some embodiments, attribute-based navigation module 320 is located on a PNA and provides an interface directly on the PNA. In some embodiments, attribute-based navigation module 320 is located on a server separate from a PNA and provides information to a user interface located on the PNA. In some embodiments, the user interface may provide user interface elements whereby the user may select options including, but not limited to, path preferences, a variable attribute such as safety, access to medical care, fuel, or access to services, and preferences for path designations.

Figure 4A:
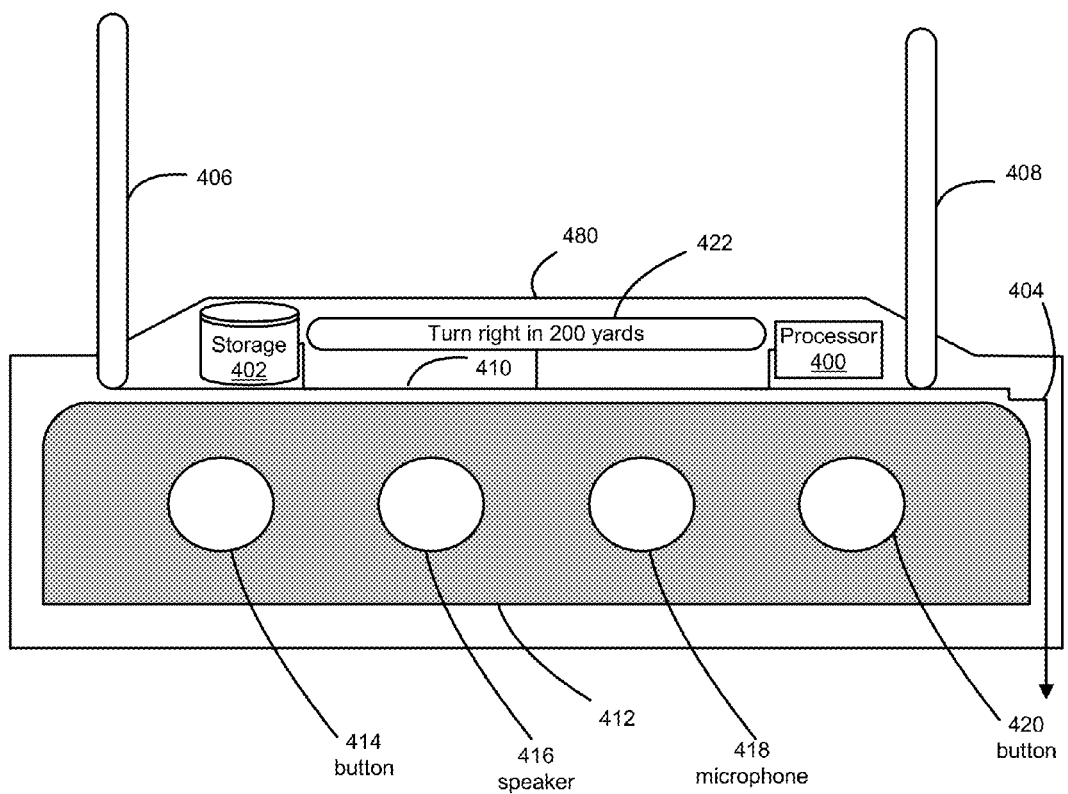
FIG. 4A illustrates a hardware module for performing attribute-based navigation, according to some embodiments.

FIG. 4A illustrates a hardware module for performing attribute-based navigation, according to some embodiments. As will be appreciated by one skilled in the art, FIG. 4A is a simplified representation of PNA 480, and one skilled in the art will, in light of the present disclosure, realize that it is possible to add, remove and substitute various components to fit the needs of various embodiments. PNA 480 supports and in some embodiments performs, responsive to a request for a location having a variable attribute, selecting a destination based at least in part upon a value of the variable attribute, and providing navigation instructions from a current location to the destination. Further, PNA 480 supports and in some embodiments performs, responsive to a request for a path having a variable attribute, providing navigation instructions from a current location.

PNA 480 contains a processor 400, which may execute all of or components of an attribute-based navigation module as described above, a storage unit 402, a GPS antenna 406, a data transceiver antenna 408, a sensor lead 404, a tactile input subsystem 412 and a display unit 422. Processor 400, storage unit 402, sensor lead 404, GPS antenna 406, data transceiver antenna 408, tactile input subsystem 412 and display unit 422 are connected by a bus 410, which provides signal connectivity between processor 400, storage unit 402, sensor lead 404, GPS antenna 406, data transceiver antenna 408, tactile input subsystem 412 and display unit 422.

Processor 400 provides centralized control for PNA 480, executing instructions and processing data stored on storage unit 402, which one skilled in the art will, in light of the present disclosure, realize can be embodied by one of many forms of memory or disk storage, among other computer-readable storage media. GPS antenna 406 receives location signals, which enable processor 400 to determine a location of PNA 480. PNA 480 uses data transceiver antenna 408 for transmission of data and messages over, for example, a short-range radio connection, a medium-range wireless signal or a satellite uplink. Embodiments of the present invention support radio/modem, cellular-based, shortwave, Bluetooth, Wi-Fi, and like implementations. Some embodiments use only a single antenna.

PNA 480 communicates with a user through display unit 422, and a user communicates with PNA 480 through tactile input subsystem 412, such as a set of buttons and knobs or a keypad. A sensor lead 404, or in some embodiments, multiple sensor leads, provide a data acquisition interface to enable PNA 400 to receive signals from, and in some embodiments provide signals to, a vehicle or unit of equipment to which PNA 480 is attached. Signals readable by PNA 480 over sensor lead 404 can include electrical impulses, such as data signals from an onboard computer in a vehicle or unit of equipment to which PNA 480 is attached. Sensor lead 404 can attach to an interface (not shown) to a vehicle's onboard diagnostic system or from actual sensors indicative of asset conditions, such as speed or direction as noted by a gyroscope.

PNA 480 uses data transceiver antenna 408 for transmission of data and messages, when, for example, a user presses button 414 to request for a location having a variable attribute. In some embodiments, PNA 480 uses data transceiver antenna 408 to transmit both the request and a current location. PNA 480 further uses data transceiver antenna 408 for receipt navigation instructions.

Device configuration of PNA 480 can be performed manually using tactile input subsystem 312 and display unit 322 or by using data transceiver antenna 408 to communicate configuration parameters from a server. PNA 480 also typically includes a serial port (not shown), and, in some embodiments, a user can connect to PNA 480 through a serial connection and issue the configuration commands, update firmware or perform other necessary functions.

Display unit 422 and speaker 418 can be used to perform providing navigation instructions from a current location. A microphone 418 can be used to provide content for a distress signal to be transmitted by PNA 480. Likewise, button 414 can be used to receive a request for a location having a variable attribute and button 420 may be used to receive a request for transmission of a distress signal. A free-standing PNA 480, as shown, may be carried as a piece of equipment by a walking user, attached to clothing, attached to a vehicle, or embedded in other equipment, such as weapons or armor carried by an infantryman.

Figure 4B:
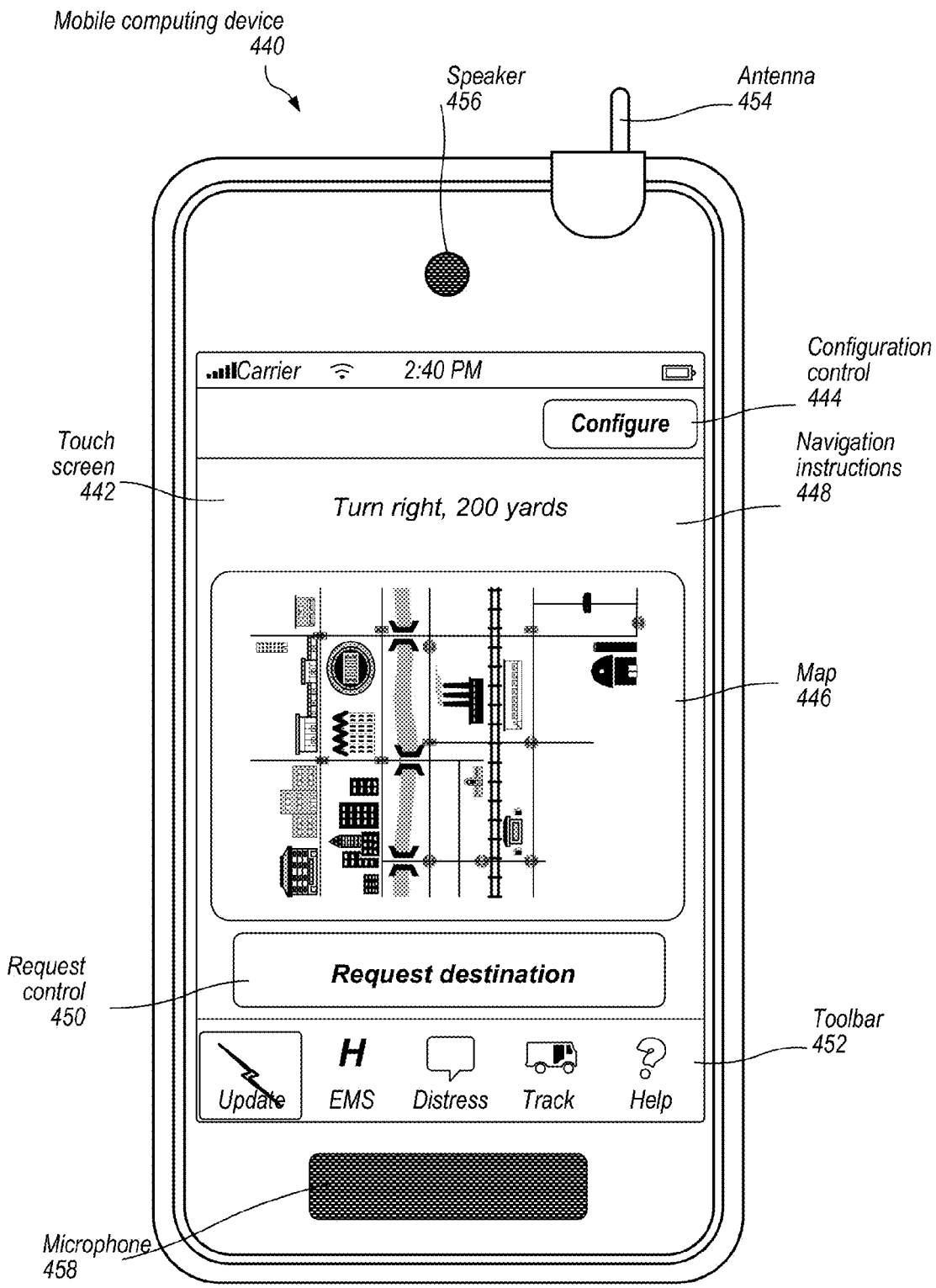
FIG. 4B depicts operation of a user interface for a software module for performing attribute-based navigation, according to some embodiments.

FIG. 4B depicts operation of a user interface for a software module for performing attribute-based navigation, according to some embodiments. A mobile computing device 440 (e.g., a smartphone or tablet computer, though embodiments will vary as to computing hardware) includes a PNA or a user interface of a PNA embodied as software executing on mobile computing device 440. As will be appreciated by one skilled in the art, FIG. 4B is a simplified representation of an interface on mobile computing device 440, and one skilled in the art will, in light of the present disclosure, realize that it is possible to add, remove and substitute various components to fit the needs of various embodiments. In some embodiments, mobile computing device 440 supports and in some embodiments performs through instructions stored on mobile computing device 440, responsive to a request for a location having a variable attribute, selecting a destination based at least in part upon a value of the variable attribute, and providing navigation instructions from a current location to the destination. In some embodiments, mobile computing device 440 supports and in some embodiments performs through instructions stored on mobile computing device 440, responsive to a request for a path having a variable attribute, providing navigation instructions from a current location. In other embodiments, the selecting and providing are executed on a server and communicated through a user interface on mobile computing device 440.

Mobile computing device 440 contains a processor (not shown), which may execute all of or components of an attribute-based navigation module as described above, a storage unit (not shown), a GPS/data transceiver antenna 454, and a touchscreen 442. Mobile computing device 440 communicates with a user through touchscreen 442, and a user communicates with mobile computing device 440 through touchscreen 442, as shown. A request control 450 allows a mobile computing device to receive a request for a location having a variable attribute.

Mobile computing device 440 uses GPS/data transceiver antenna 454 for transmission of data and messages, when, for example, a user actuates request control 450 to cause transmission of a request for a location having a variable attribute. In some embodiments, mobile computing device 440 uses data transceiver antenna 454 to transmit both the request and a current location. Mobile computing device 440 further uses data transceiver antenna 454 for receipt navigation instructions 448 from a current location to the destination for display. Mobile device 440 further displays map 446 indicating a visual representation of navigation instructions 448 from a current location to the destination.

Device configuration of mobile computing device 440 can be performed manually through a utility selected using a configuration control 444 or by using data transceiver antenna 454 to communicate standard configuration parameters from a server. Mobile computing device 440 also typically includes a serial port (not shown), and a user can connect to mobile computing device 440 through a serial connection and issue the configuration commands, update firmware or perform other necessary functions.

Touchscreen 440 and speaker 456 can be used to perform providing navigation instructions from a current location. A microphone 458 can be used to provide content for a distress signal to be transmitted by mobile computing device 440 or to provide configuration commands, or to request a destination having a variable attribute. A toolbar 442 can be used to request application help, send a distress signal, perform an update, request a different variable attribute (medical assistance) or enable location tracking. Mobile computing device 440, as shown, may be carried as a piece of equipment by a walking user, attached to a vehicle, or embedded in other equipment, such as weapons carried by an infantryman.

Example Operations

Figure 5A:
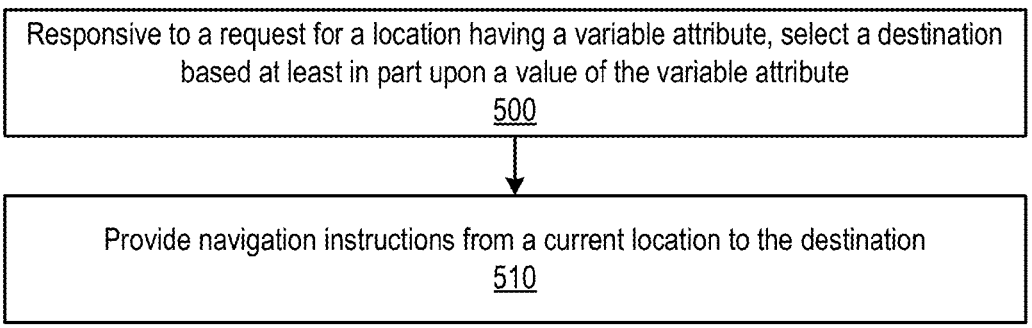
FIG. 5A is a high-level logical flowchart of operations used in performing attribute-based navigation according to some embodiments.

FIG. 5A is a high-level logical flowchart of operations used in performing attribute-based navigation according to some embodiments. Responsive to a request for a location having a variable attribute, a destination is selected based at least in part upon a value of the variable attribute (block 500). Navigation instructions from a current location to the destination are provided (block 510).

Figure 5B:
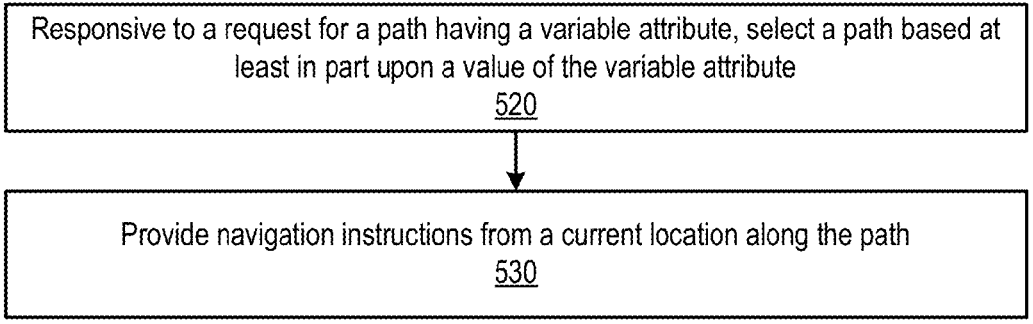
FIG. 5B is a high-level logical flowchart of operations used in performing attribute-based navigation according to some embodiments.

FIG. 5B is a high-level logical flowchart of operations used in performing attribute-based navigation according to some embodiments. Responsive to a request for a path having a variable attribute, a path is selected based at least in part upon a value of the variable attribute (block 520). Navigation instructions from a current location along the path are provided (block 530).

Figure 6A:
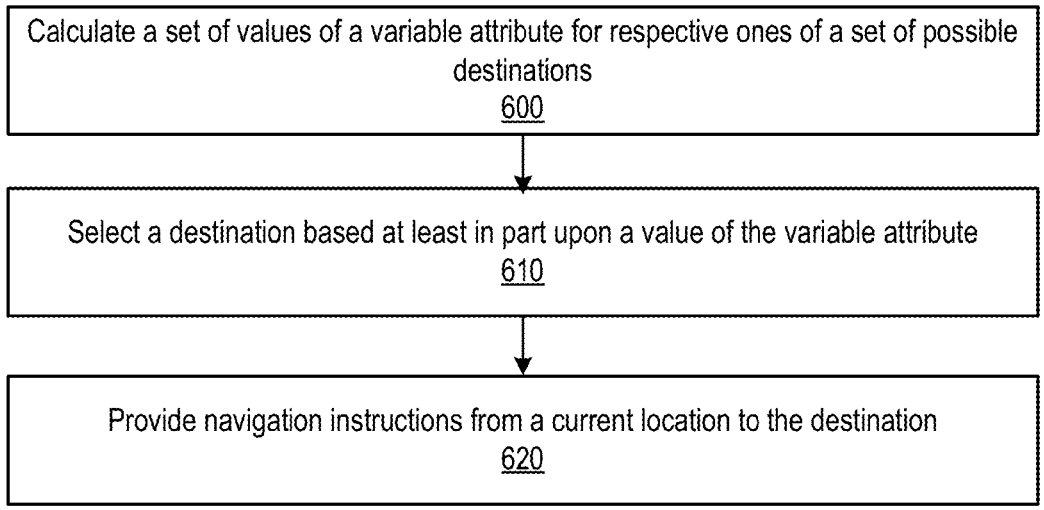
FIG. 6A is a high-level logical flowchart of operations used in performing attribute-based navigation according to some embodiments.

FIG. 6A is a high-level logical flowchart of operations used in performing attribute-based navigation according to some embodiments. A set of values of a variable attribute for respective ones of a set of possible destinations is calculated (block 600). A destination is selected, based at least in part upon a value of the variable attribute (block 610). Navigation instructions from a current location to the destination are provided (block 620).

Figure 6B:
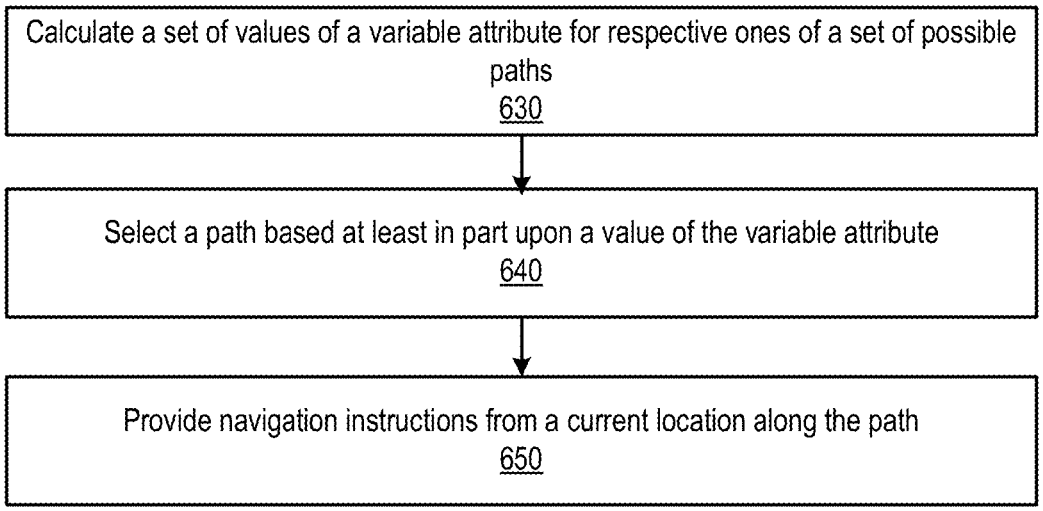
FIG. 6B is a high-level logical flowchart of operations used in performing attribute-based navigation according to some embodiments.

FIG. 6B is a high-level logical flowchart of operations used in performing attribute-based navigation according to some embodiments. A set of values of a variable attribute for respective ones of a set of possible paths is calculated (block 630). A path is selected, based at least in part upon a value of the variable attribute (block 640). Navigation instructions from a current location are provided (block 650).

Figure 7A:
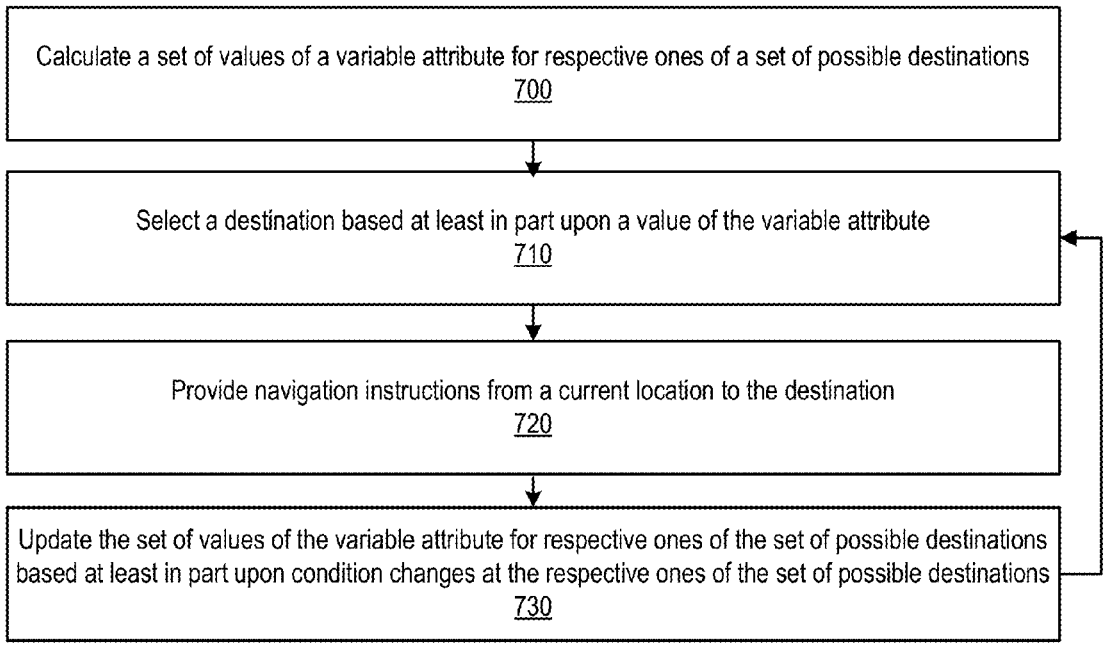
FIG. 7A is a high-level logical flowchart of operations used in performing attribute-based navigation according to some embodiments.

FIG. 7A is a high-level logical flowchart of operations used in performing attribute-based navigation according to some embodiments. A set of values of a variable attribute is calculated for respective ones of a set of possible destinations (block 700). A destination is selected based at least in part upon a value of the variable attribute (block 710). Navigation instructions from a current location to the destination are provided (block 720). The set of values of the variable attribute for respective ones of the set of possible destinations is updated based at least in part upon condition changes at the respective ones of the set of possible destinations (block 730). In some embodiments, the process then returns to block 710, which is described above.

Figure 7B:
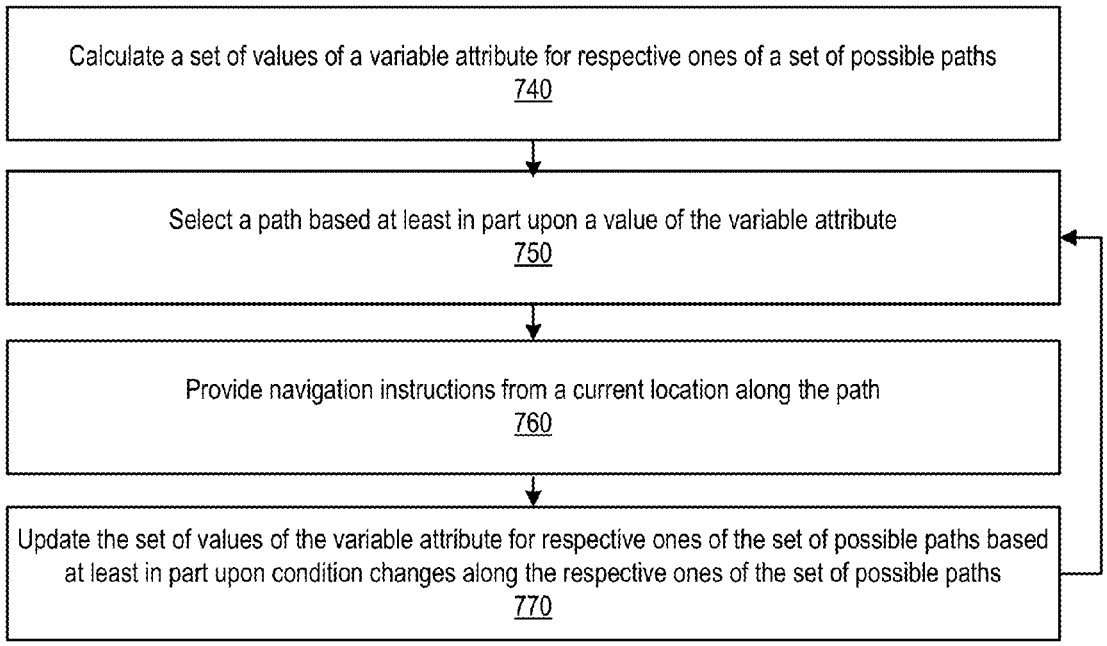
FIG. 7B is a high-level logical flowchart of operations used in performing attribute-based navigation according to some embodiments.

FIG. 7B is a high-level logical flowchart of operations used in performing attribute-based navigation according to some embodiments. A set of values of a variable attribute is calculated for respective ones of a set of possible paths (block 740). A path is selected based at least in part upon a value of the variable attribute (block 750). Navigation instructions from a current location along the path are provided (block 760). The set of values of the variable attribute for respective ones of the set of possible paths is updated based at least in part upon condition changes along the respective ones of the set of possible paths (block 770). In some embodiments, the process then returns to block 740, which is described above.

Figure 8:
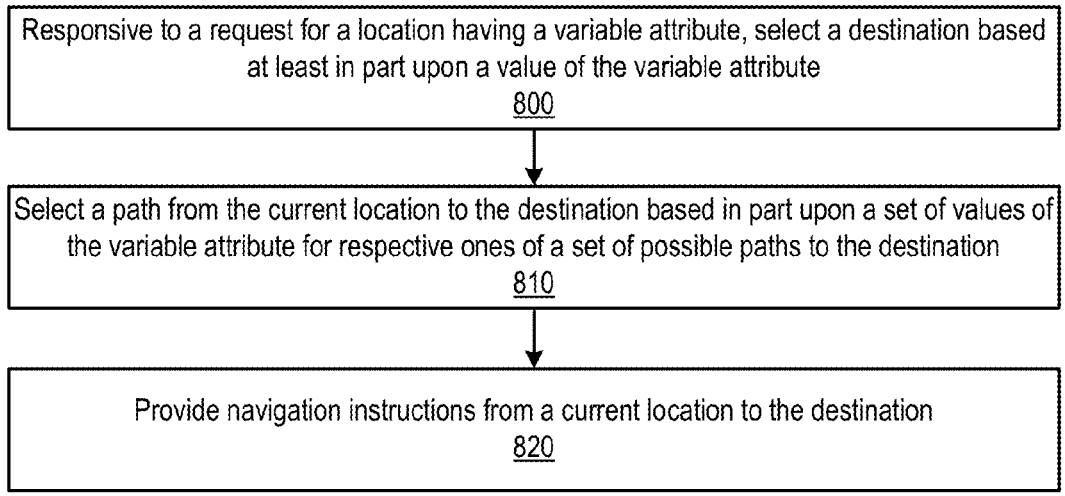
FIG. 8 is a high-level logical flowchart of operations used in performing attribute-based navigation according to some embodiments.

FIG. 8 is a high-level logical flowchart of operations used in performing attribute-based navigation according to some embodiments. Responsive to a request for a location having a variable attribute, a destination is selected based at least in part upon a value of the variable attribute (block 800). A path from the current location to the destination is selected based in part upon a set of values of the variable attribute for respective ones of a set of possible paths to the destination (block 810). Navigation instructions from a current location to the destination are provided (block 820).

Figure 9:
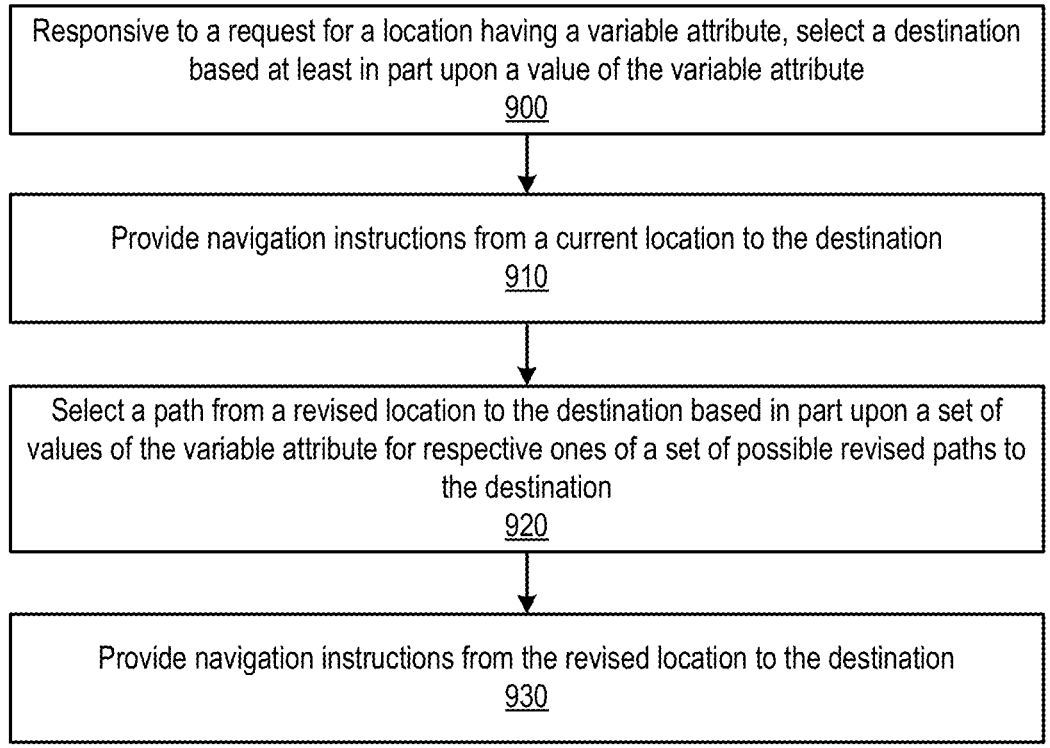
FIG. 9 is a high-level logical flowchart of operations used in performing attribute-based navigation according to some embodiments.

FIG. 9 is a high-level logical flowchart of operations used in performing attribute-based navigation according to some embodiments. Responsive to a request for a location having a variable attribute, a destination is selected based at least in part upon a value of the variable attribute (block 900). Navigation instructions from a current location to the destination are provided (block 910). A path from a revised location to the destination is selected based in part upon a set of values of the variable attribute for respective ones of a set of possible revised paths to the destination (block 920). Navigation instructions from the revised location to the destination are provided (block 930).

Figure 10:
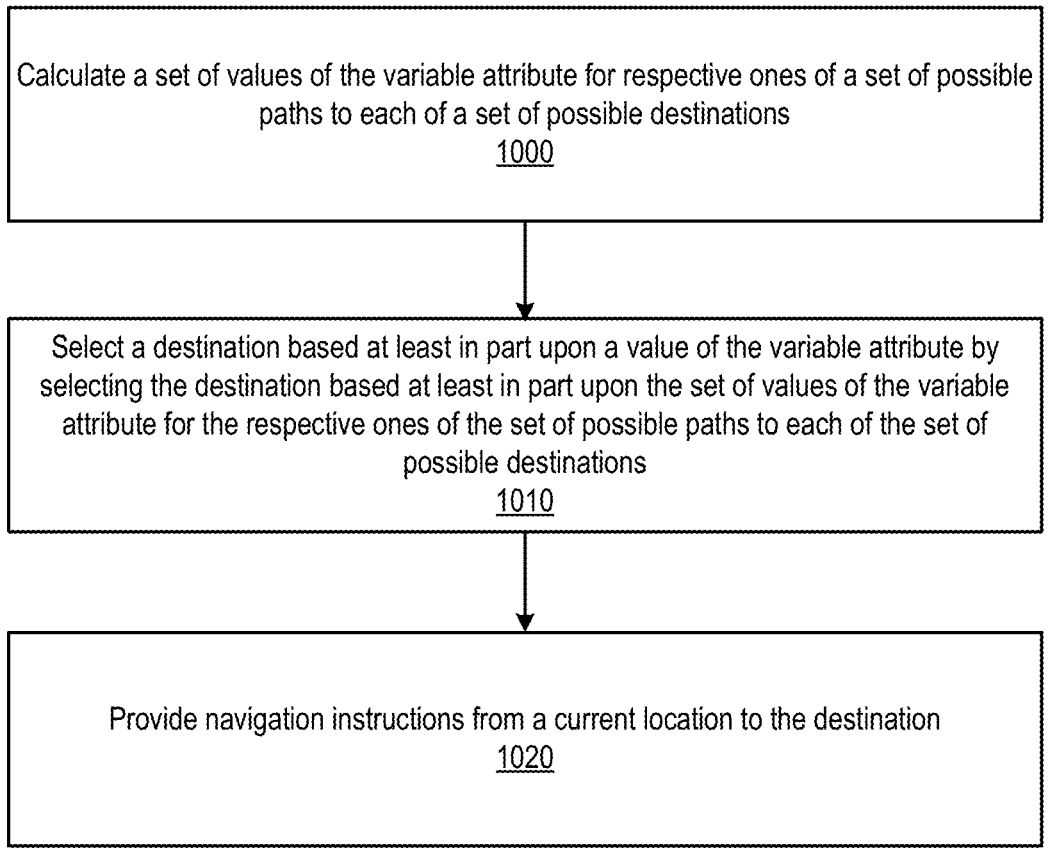
FIG. 10 is a high-level logical flowchart of operations used in performing attribute-based navigation according to some embodiments.

FIG. 10 is a high-level logical flowchart of operations used in performing attribute-based navigation according to some embodiments. A set of values of the variable attribute for respective ones of a set of possible paths to each of a set of possible destinations is calculated (block 1000). A destination is selected based at least in part upon a value of the variable attribute by selecting the destination based at least in part upon the set of values of the variable attribute for the respective ones of the set of possible paths to each of the set of possible destinations (block 1010). Navigation instructions are provided from a current location to the destination (block 1020).

Figure 11:
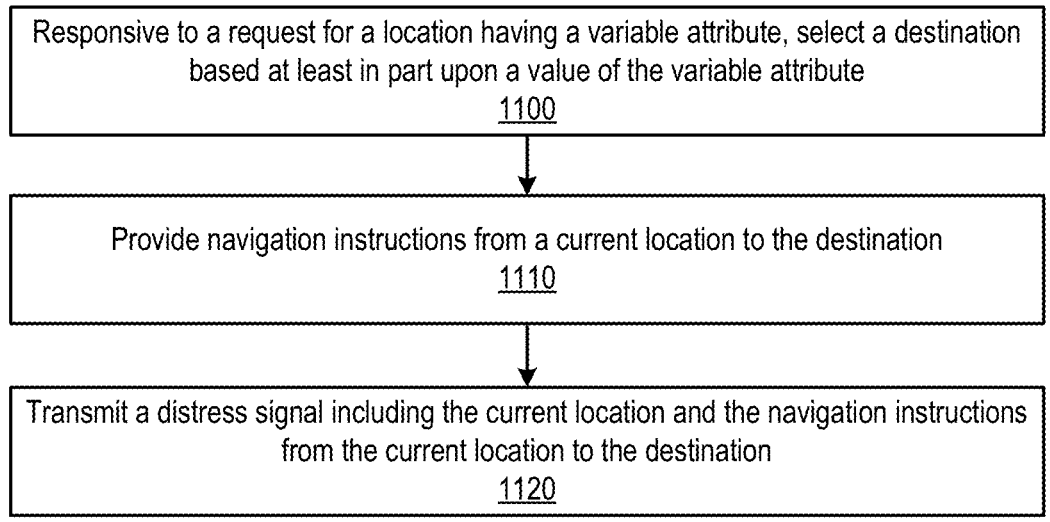
FIG. 11 is a high-level logical flowchart of operations used in performing attribute-based navigation according to some embodiments.
Figure 12:
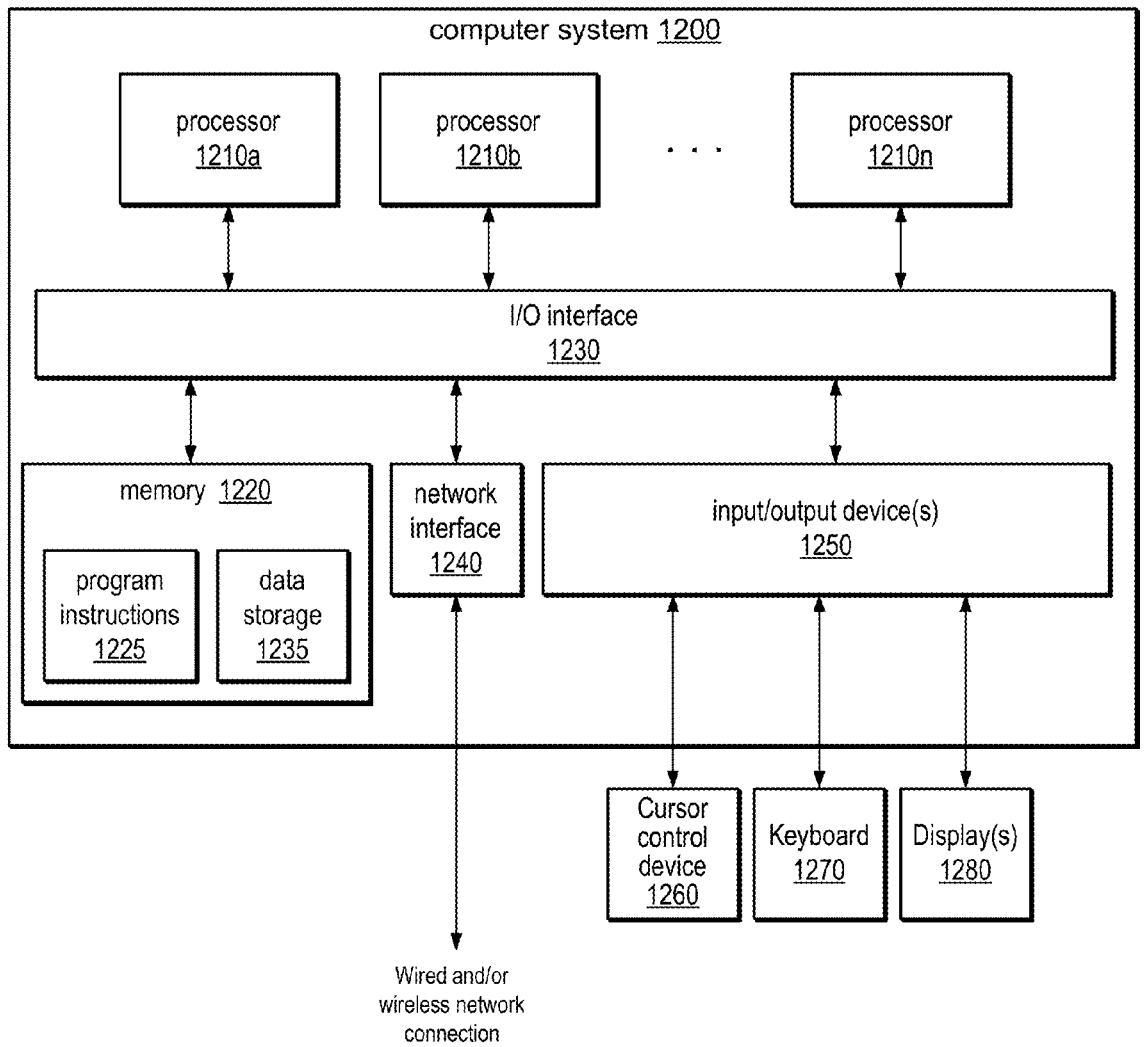
FIG. 12 illustrates an example computer system that may be used in embodiments.

FIG. 11 is a high-level logical flowchart of operations used in performing attribute-based navigation according to some embodiments. Responsive to a request for a location having a variable attribute, a destination is selected based at least in part upon a value of the variable attribute (block 1100). Navigation instructions from a current location to the destination are provided (block 1110). A distress signal including the current location and the navigation instructions from the current location to the destination are transmitted (block 1120).

Example System

Embodiments of an attribute-based navigation module and/or of the various attribute-based navigation techniques as described herein may be executed on one or more computer systems, which may interact with various other devices. One such computer system is illustrated by FIG. 12. In different embodiments, computer system 1200 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1200 includes one or more processors 1210 coupled to a system memory 1220 via an input/output (I/O) interface 1230. Computer system 1200 further includes a network interface 1240 coupled to I/O interface 1230, and one or more input/output devices 1250, such as cursor control device 1260, keyboard 1270, and display(s) 1280. In some embodiments, it is contemplated that embodiments may be implemented using a single instance of computer system 1200, while in other embodiments multiple such systems, or multiple nodes making up computer system 1200, may be configured to host different portions or instances of embodiments. For example, in one embodiment some elements may be implemented via one or more nodes of computer system 1200 that are distinct from those nodes implementing other elements.

In various embodiments, computer system 1200 may be a uniprocessor system including one processor 1210, or a multiprocessor system including several processors 1210 (e.g., two, four, eight, or another suitable number). Processors 1210 may be any suitable processor capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

In some embodiments, at least one processor 1210 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1220 may be configured to store program instructions and/or data accessible by processor 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of an attribute-based navigation module are shown stored within system memory 1220 as program instructions 1225 and data storage 1235, respectively. In other embodiments, program instructions and/or data may be received, sent or stored upon different types of computer-accessible media or on similar media separate from system memory 1220 or computer system 1200. Generally speaking, a computer-accessible medium may include storage media or memory media such as magnetic or optical media, e.g., disk or CD/DVD-ROM coupled to computer system 1200 via I/O interface 1230. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1240.

In one embodiment, I/O interface 1230 may be configured to coordinate I/O traffic between processor 1210, system memory 1220, and any peripheral devices in the device, including network interface 1240 or other peripheral interfaces, such as input/output devices 1250. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. In addition, in some embodiments some or all of the functionality of I/O interface 1230, such as an interface to system memory 1220, may be incorporated directly into processor 1210.

Network interface 1240 may be configured to allow data to be exchanged between computer system 1200 and other devices attached to a network, such as other computer systems, or between nodes of computer system 1200. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1250 may, in some embodiments, include one or more display terminals, keyboards, keypads, touchpads, scanning devices, voice or optical recognition devices, or any other devices suitable for entering or retrieving data by one or more computer system 1200. Multiple input/output devices 1250 may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1240.

As shown in FIG. 12, memory 1220 may include program instructions 1225, configured to implement embodiments of an attribute-based navigation module as described herein, and data storage 1235, comprising various data accessible by program instructions 1225. In one embodiment, program instructions 1225 may include software elements of embodiments of an attribute-based navigation module as illustrated in the above Figures. Data storage 1235 may include data that may be used in embodiments. In other embodiments, other or different software elements and data may be included.

Those skilled in the art will appreciate that computer system 1200 is merely illustrative and is not intended to limit the scope of an attribute-based navigation module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method comprising:
   using one or more processors to perform
      responsive to a request for a safe vehicular path from a current location determined via a GPS, in a battlefield that does not identify a destination, selecting the safe vehicular path by:
         determining a temporally-variable safety attribute associated with the current location in the battlefield;
         evaluating potential paths based on temporally-variable safety attributes associated with battlefield conditions along the potential paths, wherein the battlefield conditions comprise data indicating troop movements, artillery fire, presence of friendly forces and air cover; and
         comparing the temporally-variable safety attribute associated with the current location in the battlefield to the temporally-variable safety attributes associated with the battlefield conditions along the potential paths to identify the safe vehicular path as one of the potential paths having greater safety relative to the current location in the battlefield; and
      providing navigation instructions from the current location in the battlefield in accordance with the safe vehicular path.

2. The method of claim 1, wherein evaluating the potential paths further includes calculating a set of values of a temporally-variable safety attribute for respective ones of a set of possible destinations.

3. The method of claim 2, wherein the method further comprises:
   updating the set of values of the temporally-variable safety attribute for the respective ones of the set of possible destinations based at least in part upon condition changes at the respective ones of the set of possible destinations.

4. The method of claim 1, further comprising:
   revising the safe vehicular path from a revised location based in part upon a set of values of the temporally-variable safety attribute for respective ones of a set of possible revised paths based in part upon updated conditions of locations along the safe vehicular path.

5. The method of claim 1, wherein:
   evaluating the potential paths further includes calculating a set of values of the temporally-variable safety attribute for respective ones of the potential paths to each of a set of possible destinations; and selecting a destination from the set of possible destinations based at least in part upon the set of values of the temporally-variable safety attribute.

6. The method of claim 1, further comprising:

transmitting a distress signal, wherein the distress signal comprises the current location and the navigation instructions.

7. A method comprising:

using one or more processors to perform responsive to a request for a safe vehicular path from a current location determined via a GPS, in a battlefield that does not identify a destination, selecting the safe vehicular path by:

determining a temporally-variable safety attribute associated with the current location in the battlefield;

evaluating potential paths based on temporally-variable safety attributes associated with battlefield conditions along the potential paths wherein the battlefield conditions comprise data indicating troop movements, artillery fire, presence of friendly forces and air cover; and comparing the temporally-variable safety attribute associated with the current location in the battlefield to the temporally-variable safety attributes associated with the battlefield conditions along the potential paths to identify the safe vehicular path as one of the potential paths having greater safety relative to the current location in the battlefield; and providing navigation instructions from the current location in the battlefield along the safe vehicular path.

8. The method of claim 7, wherein evaluating the potential paths further includes calculating a set of values of a temporally-variable safety attribute for respective ones of a set of possible destinations.

9. The method of claim 7, wherein the method further comprises:

updating the temporally-variable safety attribute associated with the potential paths based at least in part upon condition changes along potential paths.

10. The method of claim 7, further comprising:

revising the safe vehicular path from a revised location based in part upon a set of values of the temporally-variable safety attribute for respective ones of a set of possible revised paths based in part upon updated conditions of locations along the safe vehicular path.

11. The method of claim 7, wherein:

evaluating the potential paths further includes calculating a set of values of the temporally-variable safety attribute for respective ones of the potential paths to each of a set of possible destinations; and selecting a destination from the set of possible destinations based at least in part upon a value of the temporally-variable safety attribute associated with the potential paths.

12. The method of claim 7, further comprising:

transmitting a distress signal, wherein the distress signal comprises the current location and the navigation instructions.

13. The method of claim 7, further comprising:

calculating the temporally-variable safety attributes associated with the potential paths based on location relative to an attribute fence.

14. A non-transitory computer-readable storage medium storing program instructions, wherein the program instructions are computer-executable to implement:

responsive to a request for a safe vehicular path from a current location determined via a GPS, in a battlefield that does not identify a destination, selecting the safe vehicular path by:

determining a temporally-variable safety attribute associated with the current location in the battlefield;

evaluating potential paths based on temporally-variable safety attributes associated with battlefield conditions along the potential paths wherein the battlefield conditions comprise data indicating troop movements, artillery fire, presence of friendly forces and air cover; and comparing the temporally-variable safety attribute associated with the current location in the battlefield to the temporally-variable safety attributes associated with the battlefield conditions along the potential paths to identify the safe vehicular path as one of the potential paths having greater safety relative to the current location in the battlefield; and providing navigation instructions from the current location in the battlefield in accordance with the safe vehicular path.

15. The non-transitory computer-readable storage medium of claim 14, further comprising program instructions computer-executable to implement:

calculating a set of values of a temporally-variable safety attribute for respective ones of a set of possible destinations.

16. The non-transitory computer-readable storage medium of claim 15, further comprising program instructions computer-executable to implement:

updating the set of values of the temporally-variable safety attribute for the respective ones of the set of possible destinations based at least in part upon condition changes at the respective ones of the set of possible destinations.

17. The non-transitory computer-readable storage medium of claim 14, further comprising program instructions computer-executable to implement:

revising the safe vehicular path from a revised location based in part upon a set of values of the temporally-variable safety attribute for respective ones of a set of possible revised paths based in part upon updated conditions of locations along the safe vehicular path.

18. The non-transitory computer-readable storage medium of claim 14, further comprising program instructions computer-executable to implement:

calculating a set of values of the temporally-variable safety attribute for respective ones of the potential paths to each of a set of possible destinations, and selecting a destination from the set of possible destinations based at least in part upon the set of values of the temporally-variable safety attribute.

\* \* \* \* \*